United States Patent [19]
Uribe-Echebarria Diaz De Mendibil

[11] Patent Number: 5,426,583
[45] Date of Patent: Jun. 20, 1995

[54] AUTOMATIC INTERLINGUAL TRANSLATION SYSTEM

[76] Inventor: Gregorio Uribe-Echebarria Diaz De Mendibil, Legazpi 6, Erandio, Bilbao, Spain, 48950

[21] Appl. No.: 188,213

[22] Filed: Jan. 27, 1994

[30] Foreign Application Priority Data

Feb. 2, 1993 [ES] Spain ................................. 9300182

[51] Int. Cl.⁶ ............................................. G06F 17/28
[52] U.S. Cl. ................................................ 364/419.08
[58] Field of Search ....................... 364/419.04, 419.03

[56] References Cited

FOREIGN PATENT DOCUMENTS 2209614 5/1989 United Kingdom .
8805946 8/1988 WIPO .

OTHER PUBLICATIONS

Communications of the Association for Computing Machinery, vol. 33, No. 5, May 1990, New York, U.S., pp. 521–527 "An AI-Based Approach to Machine Translation in Indian Languages" by S. Raman and N. Alwar.
TIME Jul. 31, 1989, New York, U.S., p. 39 "Trying to Decipher Babel" by B. Hillenbrand.

*Primary Examiner*—Donald E. McElheny, Jr.
*Attorney, Agent, or Firm*—Brumbaugh, Graves, Donohue & Raymond

[57] ABSTRACT

Automatic interlingual translation system which comprises analysis of the sentences of a source-language text in order to impart to them the corresponding morphological, syntactical and semantic characteristics, carrying out a first transfer of the analysed text to an intermediate language, integrating, by means of a universal motor of conversion of the language, the previously transferred sentences in order to express them in an interlingua possessing all the morphological, syntactical and semantic features of the languages to be translated, carrying out a second transfer of the source-language sentences to sentences in a second intermediate language already possessing all the structural characteristics of the target language, converting the sentences of the target language in an interlingua into sentences in a target language with its specific vocabulary and, in order to conclude the translation, extracting the structural analyses of the sentences in the target language. The invention is applicable to the automatic translation of texts, to database management and to voice recognition.

8 Claims, 2 Drawing Sheets

AUTOMATIC INTERLINGUAL TRANSLATION SYSTEM

FIELD OF THE INVENTION

The present invention relates to an automatic multilingual translation system of advanced design based on the interlingual approach and which makes it possible to optimise translation from an original/source text into various destination languages on the basis of a single analysis, the characteristics of the interlingual approach guaranteeing easy integration into the system of languages which are not related typologically, between which it would not be possible to guarantee a projection of linguistic information without an in-depth analysis of the content or semantic information of the message. As examples of remotely related languages may be mentioned Castillian (Spanish) and Basque.

In its investigations and in the development of its products for Natural Language Processing (PLN), this invention adopts a "multilingual global approach", since the world around us is multilingual. During its development, the invention considered the most widely spoken languages, but gave special attention and took special care to develop valid systems which permit extensions to all languages.

BACKGROUND OF THE INVENTION

The production of automatic translations has been and continues to be the subject of a number of research and development projects, since considerable economic and technological importance is given to the possibility of automatically producing a translation from certain languages into others with minimum human intervention, based almost exclusively on handling the relevant translation equipment and on effecting minor corrections in order to reflect certain nuances, contained in the original text, in the translated text which the translation machine has not been capable of rendering. As an example of the economic importance of translation, mention should be made of the large quantity of texts (leaflets, articles, instruction manuals, etc.) which are produced throughout the world and the majority of which have to be translated into different languages. Another example is the considerable amount of its budget that the European Community allocates to translation production. The automation of translation in these and other cases which may be mentioned would undoubtedly have great economic significance, given the ensuing reduction in costs.

Some automatic translation systems which have already been developed are based on the transfer of a text in a source language to an intermediate language and from the latter to the translated text in a target language, the intermediate language representing a synthesis of morphological, syntactical and semantic characteristics common to the source language and to the intermediate language. In these systems of the prior art, the said intermediate language is usually set up always for the two concrete languages which are involved in the translation process, that is to say the same intermediate language cannot be used to translate into two or more destination languages, but each pair of source and target languages will be allocated its own intermediate language.

Consequently, an automatic translation system which, using a single intermediate language, makes it possible to translate simultaneously from one source language into two or more target languages is not known in the prior art. It is here that the invention, which has developed a system of synthesising a linguistic theory based on linguistic principles permitting computational optimisation and which has given rise to the development of highly efficient technologies for processing natural language, is of interest.

SUMMARY OF THE INVENTION

Consequently, the invention has created an automatic translation and interpretation system which makes it possible, on the basis of a text in an original language, to obtain 1) an analysis of the text which involves a high degree of comprehension of the message, 2) an unambiguous representation of the knowledge, and 3) an automatic translation into multiple destination languages with a high level of "translation quality/time". To this end, the invention has developed logic tools (software) for automatic interpretation of natural languages and artificial languages or for programming, as well as logic tools for assisting in translation.

The technology developed by the invention is "multi-platform", since it is intended for it to be able to be used within a wide range of physical equipment (hardware) and logic equipment solutions, and it is also designed to be able to be used from and towards any type of interface, such as multimedia, voice, automatic machine, etc., interfaces.

Likewise, the technology of the invention is capable of "universal utilisation", since it facilitates the interactive handling in spoken/written, natural language of machines whose controls are ordinarily based on a specific algorithmic language, and it also facilitates the handling of machines whose instructions are initially written in a specific natural language.

Lastly, the technology of the invention is "integrable", since it can be incorporated into endless applications in the field of technologies, information, communications, industry, robotics, office automation systems, etc., and can also be incorporated even into widely distributed consumer products.

BRIEF DESCRIPTION OF THE DRAWINGS

For a better understanding of the invention, reference will be made, by way of example, to the accompanying drawings, in which.

DETAILED EXPLANATION OF THE INVENTION

Figure 1:
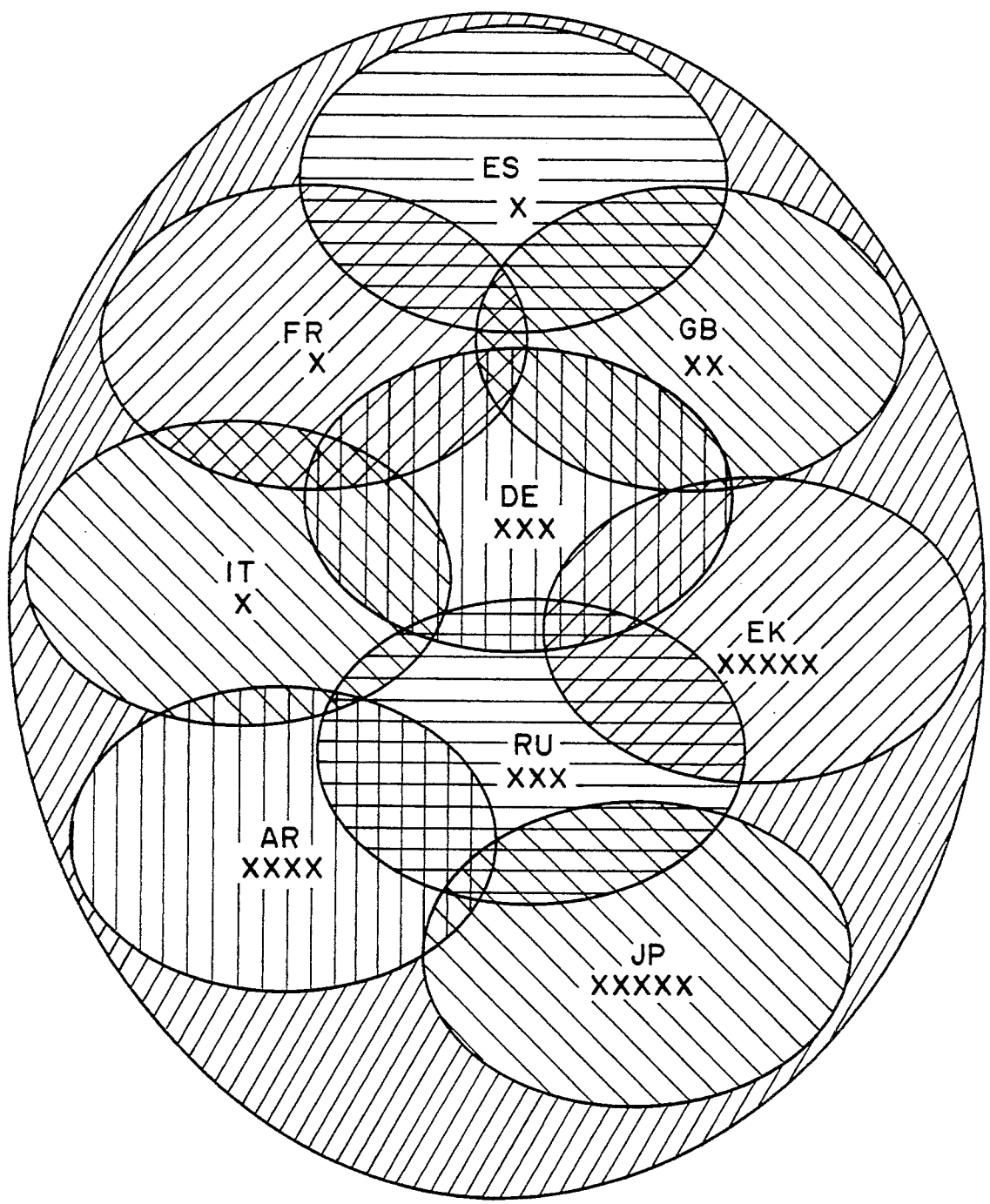
FIG. 1 is a diagrammatic global view of the typology of the languages and of the rules of linguistic construction.

Bearing in mind the antecedents set forth above, the invention has developed an automatic interlingual translation system which is a combination of the two linguistic methods currently used in automatic translation, i.e. the transfer and the interlingua, the following being the process via which a target language is arrived at from a source language: source language → analysis→transfer1→interlingua→transfer2→synthesis→target language.

On the first level of automatic translation, an analysis is performed of the sentences of the source language, conferring on them morphological, syntactical and semantic characteristics, by means of an arborescent-type clarification. In this first step the topic and commentary are determined, that is the functional order of the sentence, the actors and circumstances participating in the action, the subcategorisation of the referential and conceptual elements, and the formal order presented by the determinant/determinate or, alternatively, determinate/determinant elements. In clarifying the sentence in the source language, use is made of the grammar peculiar to that language and of a dictionary specific to it. In this phase of analysis, an attempt is made to impart to the source-language sentence defined characteristics which will permit access to the second step in the proposed process, that is to say the first transfer.

Via the first transfer, the abstract representation of the source-language sentence is preserved with its characteristics analysed, but to some extent "translated" into an auxiliary and concrete bridge language which contains all the typical aspects of the source language. It is possible to say that this is the same sentence in deep structure, but with different superficial materialisation. The source-language sentence transformed into an intermediate language which preserves all the original features of the sentence is obtained in this second link in the chain, using a bilingual dictionary and the transfer rules. These features of the source language are incorporated (and are a small part of the universal characteristics) in the third phase of the translation process.

The automatic translation developed by the invention does not pass directly from the first to the second transfer, as is generally carried out, but the source-language sentence is integrated into an interlingua through which the second transfer will be gained. This interlingua must possess all the characteristics of all the languages which it is desired to incorporate in the translation process. It is intended to be an interlingual system in which the interlingua possesses all the morphological, syntactical and semantic features of the languages it is desired to translate, also leaving a door open to new contributions from other languages.

In this respect, it should be pointed out that, although there actually appears to be a great difference between languages, the structural distance is not so great, since they can be reduced to a variety of universal models. In order to include the features of another language in an interlingua which has already been created, it will be necessary only to impart to the latter specific linguistic aspects of the new language. If one were to opt for creating a system for automatic translation between Western European languages, it would be sufficient to make use of an interlingua combining all the characteristic features of said languages, the invention of an interlingua developed specifically with this aim serving the purpose. On the other hand, if the objective were more wide-ranging and it were desired to extend translation to other, non-European and non-Western languages, use would have to be made of an interlingua containing a much larger quantity of specific features not occurring in European languages, and it would then be necessary to have recourse to an expanded interlingua. Therefore, as may be appreciated, an interlingua is not a hermetic, definitive language, but has to permit successive incorporations into and notations to the automatic translation system.

As has already been pointed out above, an important aspect of the system of the invention lies in an interlingua having the characteristics indicated, since it is the point of support with the morphological, syntactical and semantic nuances of all the languages. This interlingua carries out "in-depth" translation of the source-language sentence into a target language, transforming the sentence of the source language in a first bridge language into the sentence of the target language in a second bridge language. The interlingua is capable of realising this change because it has all the universal characteristics of the languages, that is to say that it constitutes a common meeting point between the languages. This intermediate language maintains the structure of the language used as a point of departure in the translation, which does not signify a complex aspect in the process, but absolute flexibility, since the linguistic characteristics of the source language have to be retained up to this point in the translation. In this way, a sentence in Castillian and another in Basque will not have the same interlingual representation because their linguistic structures are totally different.

Therefore, whilst, with the first transfer, a type of translation between the source-language and intermediate-language sentence is carried out, in the interlingua this sentence is integrated into a system provided with the universal features of the languages. In this phase, the source-language sentence is already integrated into the interlingua and surrounded by the universal characteristics of the languages involved in the translation process.

The passage via the interlingua leads to the fourth step in the translation process, in which the source-language sentence, screened via the first transfer and the interlingua, is transferred to the representation of this sentence in the intermediate language which already possesses all the structural characteristics of the target language (conferred by the interlingua), but which is formally represented by a second bridge language. The sentence, here, already possesses the features peculiar to the target language and it remains only to perform formal translation of the elements of the sentence.

In order to achieve the target-language sentence with its individual vocabulary, in the last phase of the system of the invention, use has to be made of the transfer rules corresponding to the second transfer and of a bilingual dictionary which makes it possible to transcribe the sentence of the target language in the interlingua into a target-language sentence with its specific vocabulary. At this level, the sentence is already actually translated and it is necessary only to extract the structural analysis from the sentence in order to arrive at the translation of the sentence into the desired language.

The process transfer1—interlingua—transfer2 develops simultaneously in the system according to the invention, however, in the above description, it was preferred to separate it and give details of it in order to obtain a better understanding of said system.

Finally, attention should be drawn to the ability of the system of the invention which makes it possible to reverse the translation via the combination of the transfer and interlingua linguistic methods, so that the target-language text can again be expressed in the source language.

The equipment which performs the integration of the text to be translated into the interlingua, which, according to the invention, is called a universal language conversion motor, consists of a circuit incorporating a memory.

FIG. 1 considers the languages ES (Castillian), FR (French), GB (English), DE (German), IT (Italian), EK (Basque), RU (Russian), AR (Arabic). and JP (Japanese).

Figure 2:
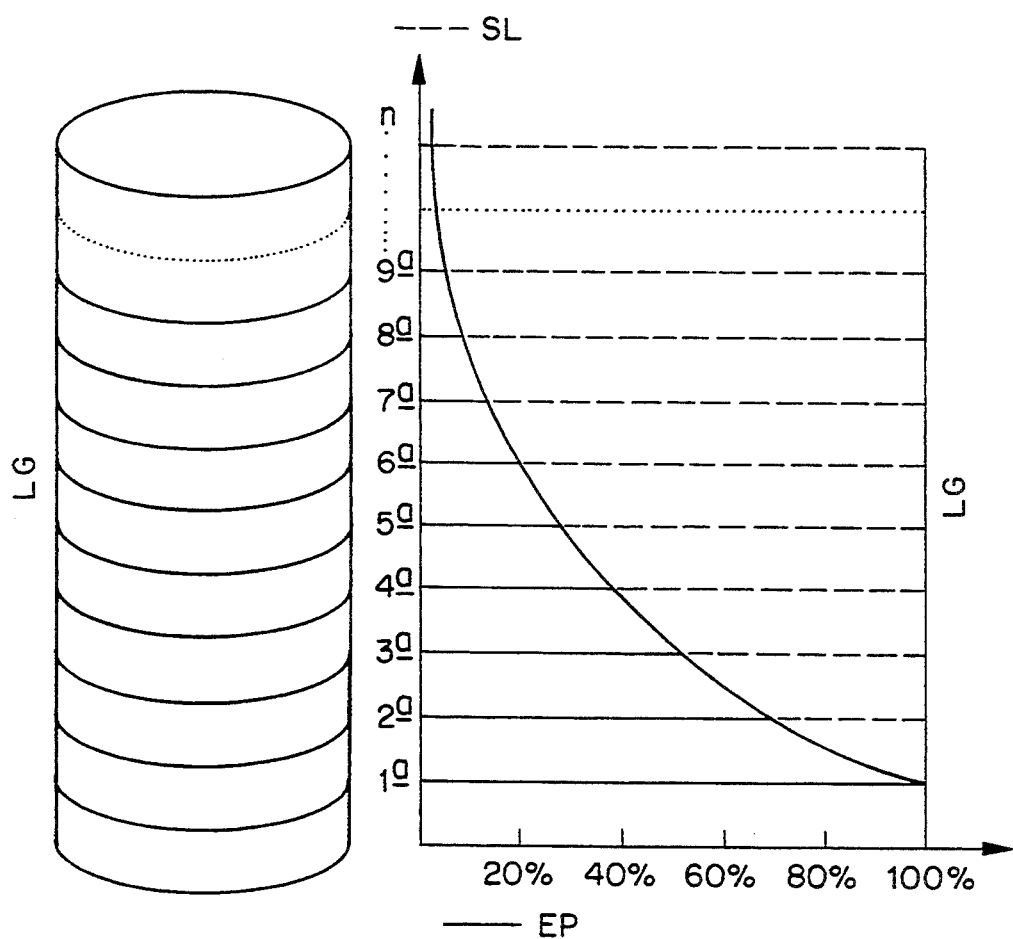
FIG. 2 is a graph illustrating the advantageous use of the invention.

In FIG. 2, the references LG, SL and EP allude, respectively, to the various languages, to their mutual synergistic features and to the study pending for each language. The determination of the synergistic features of the languages requires in-depth study in the first languages in order, then, to make advantageous use of the synergistic features in the languages studied subsequently.

Figure 3:
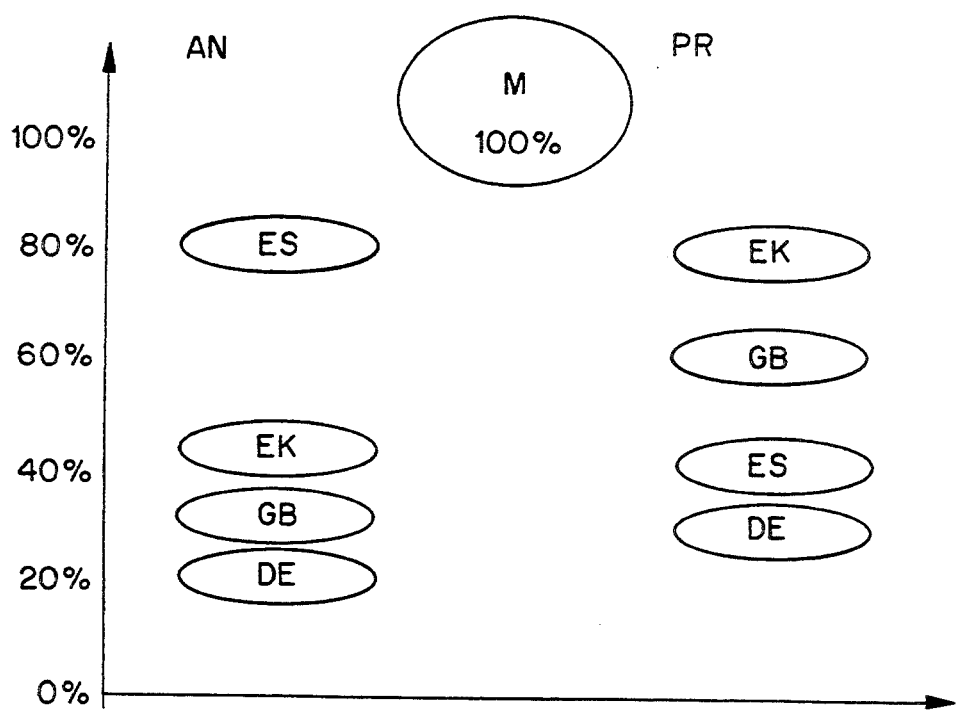
FIG. 3 is a graph illustrating the development of the system of the invention for various languages.

In FIG. 3, the references AN, M and PR signify, respectively, analysis, motor and projection, whilst the remaining references have the same meanings as indicated for FIG. 1.

The system of the invention is applicable not only to translation systems, for example as an aid in the translation of texts from various languages and as a means of automatic translation of manuals in different languages, but also to database management systems and to voice-recognition systems. In its application to database management, it permits the interactive use of databases from various different languages to the original language and also the multilingual diffusion of databases originally written in a specific language, whilst, in its application to voice recognition, is assists the linguistic interpretation of voice-recognition systems in order to improve the quality of said recognition and also permits simultaneous automatic translation between two chosen languages.

In addition, the invention is applicable to interfaces of instruments and machines, such as flight simulators, digitally controlled machines, robots, home electronics systems, etc.

A description will now be given of a concrete example of a translation program developed according to the invention. This translation system fits into so-called automatic translation systems, in which translation is carried out autonomously without user intervention. Its objective is to translate texts from a source language into a target language via an intermediate language or "interlingua". Firstly, this example program was prepared using Castillian as original language for translation into English, Basque and German, as well as for also translating from English to Castillian, Basque and German, but translations may be carried out between multiple languages, including a possibility for reverse translation, that is to say returning from the phrase translated into the target language to that in the original language. It is possible to use the program in any word processor or to key the phrases directly into the corresponding entry reserved for this purpose. This program is easy to implement and requires no exhaustive apprenticeship for the user, so that the latter can handle it without problems of any type.

This translation program takes, from the source language, a sentence defined directly by it and subjects it to an analytical process in which the abstract morphosyntactical characteristics and morphosyntactical features are determined. The sentence is clarified via various internal techniques and a definitive interpretation is offered. This interpretation is presented as a set of abstract features of the source-language sentence.

Next, the program represents (in some way) the universal structure of the sentence reflected in the intermediate language. This structure may have a universal abstract representation and a concrete representation. The sentence now possesses all the morphosyntactical, semantic and pragmatic features of the source-language sentence, but with the major advantage of being totally unambiguous. The corresponding universal content is assumed to be the same in all the languages. The structures of the particular languages lead to a kind of "linguistic common location", where all the structures fit together in what is common in the language. Naturally, the concept of linguistic universals lies at the theoretical basis of the intermediate language. Once the sentence in the intermediate language has been clarified, the developed program can translate it into the language indicated.

Subsequently, the interlingua is used to generate the sentence in the target language equivalent to the sentence in the source language. To this end, use is made of structural correspondences, that is to say transfers, both at a morphosyntactical level and at a semanticopragmatic level, so that the translation into the target language is obtained.

With regard to the components of this example translation program, it should be pointed out that, as regards the source language, it consists of a general dictionary which includes the most common and current words with their counterparts in the interlingua. Homonyms and ambiguous words are inserted in other special dictionaries which, by means of a programmed system, clarify the words of the source language. In addition to this dictionary, there are other particular specialised dictionaries referring to topics or specific disciplines which it may be desired to translate, such as computing, medicine, etc. All these specific dictionaries, together with the general dictionary, make up the dictionary of the present translation program. When starting the translation, the user may use the dictionary which is most appropriate for the texts he desires to translate. If the program cannot find a certain word in the original language in its dictionaries, this word will remain untranslated, but integrated into the text, permitting a high degree of intelligibility. Likewise, the user may introduce, into the dictionary, any word which is not included therein, for use at a later date.

Moreover, this example translation program possesses a special dictionary of idiomatic expressions and set phrases which are very difficult to translate literally. This dictionary makes it possible to deal with this type of phrase, most of which are peculiar to a specific language and have a completely different translation in the target language.

As is known, texts of a technical, commercial and scientific nature are usually the easiest to translate since they are written in a language which is less ambiguous than that of literary texts. One of the most common problems in automatic translation lies in the different senses that a single word may have and, therefore, in the choice of the appropriate term when translating from one language to another. When presenting a series of specialised dictionaries and a complex pragmatic system, the translation program considered can find the correct sense for each term.

The vocabulary consists partly of roots which, inflected with the relevant suffixes, can give rise to a large number of different words. This system streamlines the dictionary, removing a large number of words, since, if this were not the case, the dictionary would be of immense size which would, to an extent, complicate the translation process. It is calculated that, with a dictionary of roots and a small number of suffixes, it is possible to achieve multiplication of the roots by means of the relevant combinations.

As for the verb, which is usually one of the most problematical aspects in automatic translation, this has been given specially complex treatment in order to resolve any verbal inflection. Special mention should be made to irregular verbs in the source or target language, very important in English and in Castillian, and this aspects receives a satisfactory response, in accordance with the characteristics of these verbs in each language, by means of the interlingua of this program. A great effort was made in this connection in the case of the Basque language due to the different formation and composition of the verbs and due to their intrinsic peculiarities which define it as a language which is difficult to translate. The example translation program developed is capable of solving the greater part of the intricate paths presented by the complex Basque verb system.

With regard to morphosyntax, the example translation program possesses an ingenious internal mechanism whereby any type of coordinate and subordinate sentence is translated. In this entry, abundant homonyms are given (for example the Castillian "que"), which are resolved through the above-mentioned lexical contextualisation system. By virtue of the interlingua of the program, any sentence of any type is clarified, permitting easier access to the objective-translation.

Although, in the aforegoing description, what is currently regarded as being the exemplary embodiment of the automatic translation system of the invention has been set forth, experts in the field will understand that certain modifications of detail may be made to said embodiment without departing from the spirit and scope of this invention. Therefore, it is claimed that the scope of the latter is defined solely by the content of the appended claims.

I claim:

1. A method for use in a computer to automatically translate a first text based on a source language to a second text based on a different target language, said method comprising the steps of:

(a) analyzing said first text to achieve an arborescent-type clarification on morphological, syntactical and semantic characteristics of said first text;

(b) translating the analyzed text to a first intermediate language, wherein said first intermediate language contains structural characteristics of said source language;

(c) integrating the translated text into an interlingua, wherein said interlingua contains morphological, syntactical, and semantic features of a plurality of languages;

(d) translating the integrated text to a second intermediate language, wherein said second intermediate language contains structural characteristics of said target language; and (e) converting the translated, integrated text to said second text.

2. The method of claim 1, wherein said clarification includes determining personal and situational relationships, subcategorizing conceptual and referential elements, determining relative position of determinant element and of determinate element, determining actors involved, and determining circumstances participating in action, by referring to grammar of the text and to a dictionary of the source language.

3. The method of claim 1, wherein the translation of the analyzed text of step (b) is performed using a bilingual dictionary and pre-established rules of transfer so that the text is translated on a word-by-word basis while retaining all original grammatical features of the analyzed text.

4. The method of claim 1, wherein the integration of the translated text of step (c) includes converting grammatical structure of the translated text according to grammatical rules of the interlingua.

5. The method of claim 1, wherein the translation of the integrated text of step (d) is performed by using a bilingual dictionary and pre-established rules of transfer so that the text is translated on a word-by-word basis and organized in structural form of said target language.

6. The method of claim 1, wherein the conversion of text of step (e), includes using grammar rules and a dictionary of said target language to formally translate the transferred analyzed text.

7. The method of claims 1, 3, 4, or 5, wherein steps (b), (c), and (d) are performed simultaneously.

8. The method of claim 9, wherein the method is used in one of multilingual database systems, voice-recognition systems, instrument interface systems, and machine interface systems.

* * * * *